Sept. 13, 1966 W. W. ADAMS ETAL 3,272,352
AGRICULTURAL BALE-HANDLING MACHINE
Original Filed March 11, 1964 4 Sheets-Sheet 1

INVENTORS
W. W. ADAMS & T. GARRISON

INVENTORS
W.W.ADAMS & T.GARRISON

Sept. 13, 1966  W. W. ADAMS ETAL  3,272,352
AGRICULTURAL BALE-HANDLING MACHINE

Original Filed March 11, 1964  4 Sheets-Sheet 4

INVENTORS
W. W. ADAMS & T. GARRISON

United States Patent Office 3,272,352
Patented Sept. 13, 1966

3,272,352
AGRICULTURAL BALE-HANDLING MACHINE
Wayne W. Adams, 1110 S. Main St., Roswell, N. Mex.,
and Theo Garrison, Dexter, N. Mex.
Continuation of application Ser. No. 351,062, Mar. 11,
1964. This application July 29, 1965, Ser. No. 475,836
22 Claims. (Cl. 214—7)

This application is a continuation of copending application Ser. No. 351,062, filed March 11, 1964, now abandoned.

This invention relates to an agricultural bale-handling machine of the type used with an agricultural pickup baler for accumulating or grouping bales discharged by the baler and for discharging the grouped bales onto the ground for subsequent pick-up by other machines. More particularly, the invention is based on an improvement of the machine shown in U.S. patent 3,010,593, now Re. 25,750.

As shown in that patent, the bale handler is a trailer connected behind the baler to receive successive bales as they are discharged from the baler. The bales are accumulated first in a row which is moved out of the way to enable the formation of a second row and several such rows are formed in a rectangular group measuring six bales by six bales, with each bale standing on end so that its long dimension is upright. After the accumulation of a group, the entire group is discharged to the ground for subsequent pick-up. In the patented machine, each transverse row of bales is discharged by a following transverse row, which means that as the machine continues to advance over the field the discharged rows will be spaced apart rather than being grouped in the same manner as they were grouped on the machine or trailer. According to the present invention, the body of the trailer is provided with a gravity dump whereby the entire group is discharged substantially simultaneously, with the important feature that the first row of bales off the trailer falls flat on the ground and the ensuing rows lie in rearwardly and upwardly sloped shingle fashion, supported in part by the ground and in part by the preceding discharged row. The advantage here is that the sloping bales more readily shed water and the spaces beneath the bales, except for the first row of bales off the machine, due to the shingling effect, enables better circulation of air, thus preventing spoilage of the bales in the event that they are left in the field for an appreciable time.

A still further object of the invention resides in improved means for handling the bales as they come from the baler, for moving the bales into the transverse rows, and for shifting the transverse rows rearwardly until the group is formed. Further objects reside in means for retaining the bales against premature tipping, discharge etc., until the group is formed, one of these means residing in relatively laterally inwardly movable side members on the body which apply a squeezing force to the bales until the group is accumulated. A specific object, in connection with the shifting of the bales during the formation of rows, resides in a platform together with a platform extension means and pusher means for pushing each bale off of the platform means and onto the extension means in successive increments of one bale width per bale, thus eliminating costly and inefficient conveyors such as belts, chains and the like.

The foregoing and other important objects and desirable features inherent in and encompassed by the invention will become apparent as a preferred embodiment thereof is disclosed in detail in the ensuing description and accompanying sheets of drawings, the figures of which are described below.

Figures 1, 2, 3, 4, 5:
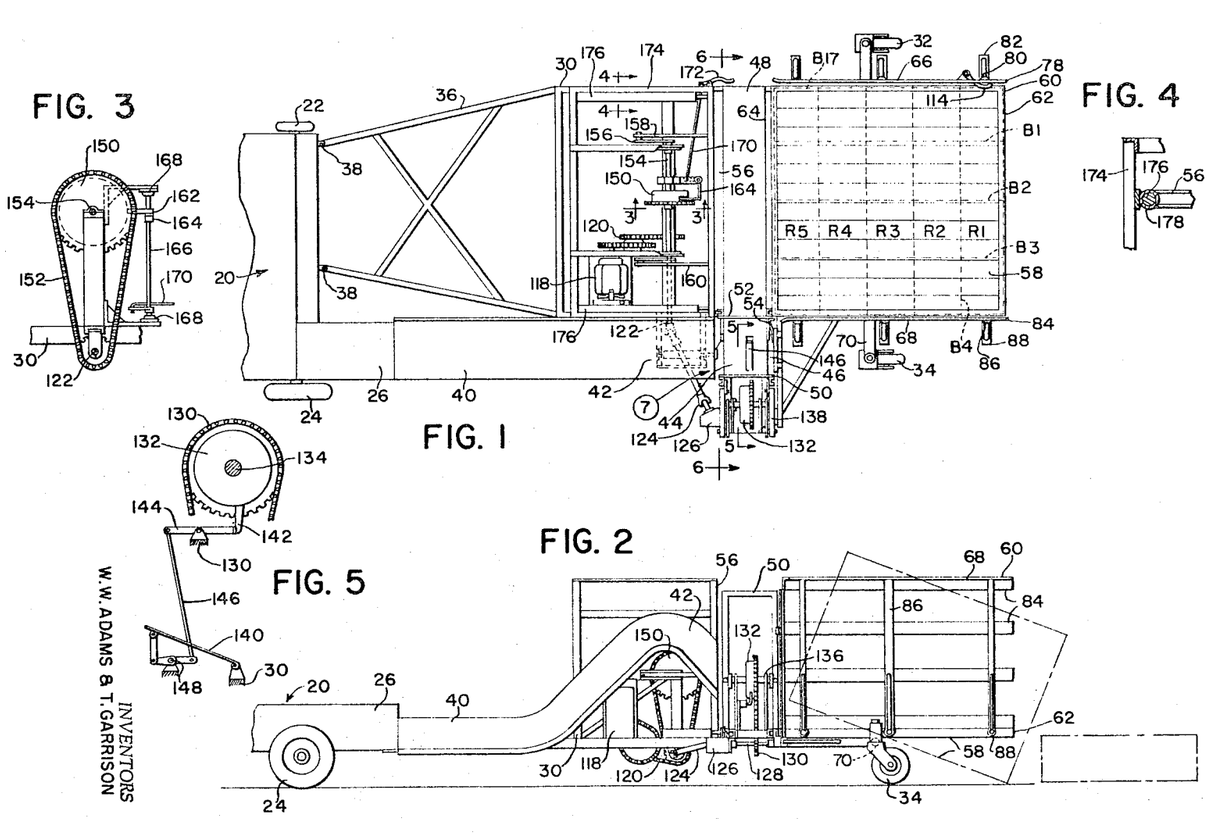
FIG. 1 is a plan view of a bale-handling machine in operative relationship to the rear portion of a typical agricultural baler.
FIG. 2 is a side view of the same, further illustrating in broken lines the discharge position of the dumping body.
FIG. 3 is a view of a portion of the drive, on an enlarged scale, as seen generally along the line 3—3 of FIG. 1.
FIG. 4 is a fragmentary section, on an enlarged scale, as seen along the line 4—4 of FIG. 1.
FIG. 5 is a view of another portion of the drive, drawn to an enlarged scale and with portions broken away, as seen generally along the line 5—5 of FIG. 1.

The numeral 20 represents the rear portion of a typical agricultural baler, carried by right- and left-hand wheels 22 and 24 and having a rearwardly directed bale case or bale outlet 26. A baler of this type, as is well known to those versed in the art, is drawn over a field of windrowed hay, by a tractor or like draft vehicle, and functions automatically to pick up the hay and to form it into bales which are individually discharged in succession through the rear open end of the bale outlet 26. The direction of travel is to the left as seen in FIGS. 1 and 2. The expressions "right" and "left" are used with respect to the position of an observer standing behind the baler and facing forwardly.

The bale-handling machine or grouper is shown here as a trailer comprising a main frame 30 carried adjacent to its rear end on right- and left-hand caster wheels 32 and 34 and connected and supported at its forward end by a hitch frame 36 connected directly to a rear portion of the baler, as at 38. Because of the combination of main frame 30, hitch frame 36 and caster wheels 32 and 34, the entire trailer is laterally rigid and follows the baler by virtue of castering of the caster wheels, as distinguished from pivoting behind the baler. The advantage of the present construction is that a frame-carried bale chute 40 on the trailer remains always in register with the bale outlet 26 of the baler so as to be always in position to receive bales therefrom.

The bale chute 40 is carried in any appropriate manner on the frame 30 and inclines upwardly and rearwardly and then slopes downwardly and rearwardly at 42 to direct bales to a platform means 44 fixedly carried at the left-hand front corner of a portion of the frame 30. The platform is delineated at its rear by a rear upright wall 46 and this, in conjunction with other structure to be presently described and further in conjunction with the downward and rearward slope of the bale chute 40 at 42 causes each bale received by the platform to be deposited thereon in an on-end position; that is, standing on end with its long dimension upright.

An adjunct to or extension of the platform 44 is an extension means 48 extending crosswise of the direction of travel or line of advance of the machine, this extension means being itself in the form of an elongated platform fixedly carried by the frame 30 and having a crosswise extent several times the width of a bale. In the present case, the extent of the extension is four bale widths.

As each bale is deposited in its on-end position on the platform 44, it is confined at its rear by the structure 46 and is further confined at its left and right, respectively, by a pusher 50 and a retainer 52. The pusher 50 is part of first shift means to be described in detail later and amounts to an upright frame substantially the size of a bale so as to be able to engage one side of a bale on the platform. The pusher is mounted for movement lengthwise of the extension means (crosswise of the direction of travel) through successive cycles or strokes of one bale width per stroke, thereby moving bales successively from the platform to the platform extension 48. The retainer 52 is likewise an upright frame which, in a starting position, engages the opposite side of a bale from the side engaged by the pusher 50. The retainer is engaged by a one-way stop 54 so that it cannot return to the left any farther than the position shown in FIG. 1. Yet, the retainer is movable across the extension means 48 until it reaches the opposite end thereof. For present purposes, suffice it to say that the retainer 52 is biased to return to the starting position (FIG. 1) and therefore the first bale received on the platform 44 is confined between the pusher and the retainer. When the pusher operates to move the first bale from the platform to the platform extension 48, this bale, together with the retainer 52, advances through an increment of one bale width to the right, and the stop 54, being of yieldable construction, engages behind this bale so as to retain the bale and the retainer in the one-increment shifted position. The pusher 50 returns to its starting position and a second bale is deposited on the platform 44 to be confined between the pusher 50 and the preceding bale. Upon the next stroke of the pusher, both bales are pushed to the right, through another one-width increment, and the stop 54 engages behind the second bale, and so on until four bales are alined on the extension 48. The number four is selected here on the basis of the illustration. Fewer or more bales could be arranged in this row.

Figure 9:
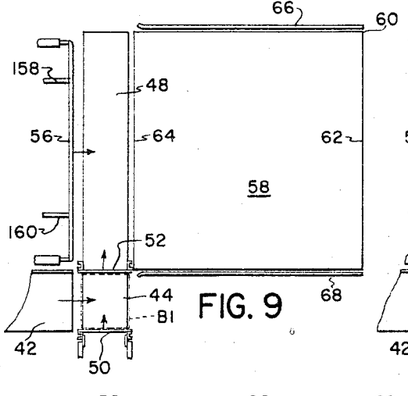
FIGS. 9, 10, 11 and 12 are schematic views illustrating the sequence of the formation of the group of bales.
Figure 10:
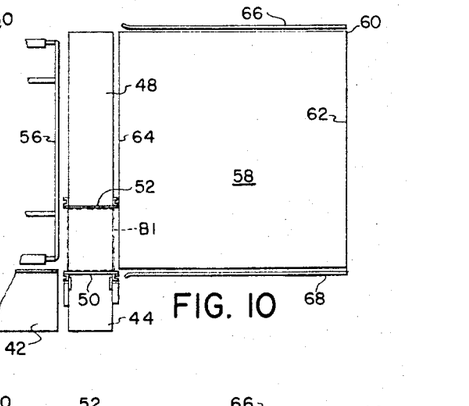
Figure 11:
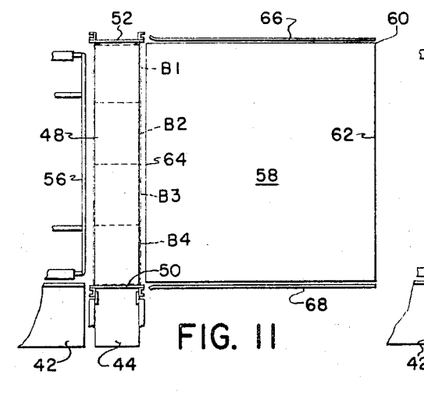

The bale first received on the platform 44 is illustrated at B1 in FIG. 9. The shift of this bale one increment to the right is shown in FIG. 10. The completion of a row of bales B1, B2, B3 and B4 is shown in FIG. 11. As seen in FIG. 9, the retainer 52 is one increment to the right, since, as already explained, the stop 54 engages the left-hand side of bale B1. As seen in FIG. 11, the retainer 52 is moved completely to the right, being in this case held in that position by the presence of the four bales backed up by the pusher 50. However, when the pusher is retracted or returns to its starting or retracted position (FIGS. 1 and 12) the stop 54 will engage B4 and hold the entire row in place.

Figure 12:
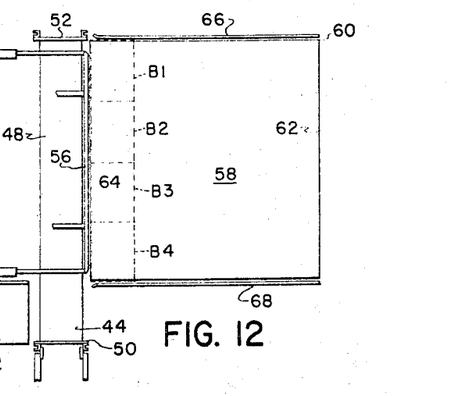

One important advantage of confining each bale between the pusher 50 and the retainer 52 or between the pusher and the preceding retainer-engaged bale is that the biasing pressure on the retainer serves to keep the bales upright as they move incrementally across the extension means despite the jouncing of the machine as it travels over the field. The pressure is sufficient to keep the bales from tipping either forwardly or rearwardly as well as laterally. However, a further protection against forward tipping is provided by a second pusher frame 56, here in the form of an upright wall-like element coextensive in width with the transverse extent of the extension 48 and high enough to engage the bales on the extension means. In its idle position, the pusher 56 lies in the position of FIGS. 1, 9, 10 and 11. Upon the completion of the row of bales (here comprising bales B1, B2, B3 and B4) the pusher is operated rearwardly in an increment equal to substantially one bale width for moving the entire row rearwardly off the extension means 48 and onto a floor 58 of a body 60 carried by the frame 30. This stage of the operation is shown in FIG. 12. Each time a row of bales is moved onto the floor 58, the pusher retracts to its position of FIG. 1, for example, and another row is formed, until ultimately five transverse rows are grouped as shown in dotted lines in FIG. 1, wherein it will be clear that the first row of bales, including bales B1, B2, B3 and B4, now becomes the rearwardmost row. It will also be seen that there is a plurality of fore-and-aft rows, the right-hand row being headed by bale B1, which is now rearwardmost and followed by succeeding bales in that row. Thus, and considering only one fore-and-aft row, it follows that this row is coextensive in length with the fore-and-aft length of the body, with the rearwardmost bale being at the rear end 62 of the body or floor and the fifth and last bale B17 being at the front end 64 of the floor. As respects the fore-and-aft characteristics of the row just referred to, those of other fore-and-aft rows will be the same. In the present instance the group of bales is four by five, but any other rectangular arrangement could be used. As the successive transverse rows are accumulated on the floor 58 of the body 60, they are confined against lateral escape by right- and left-hand side walls or members 66 and 68 respectively, these members functioning, in a manner to be presently described, to exert an inward squeezing force on the bales, establishing enough pressure to keep the bales upright and against rearward tilting, yet permitting the rows of bales to slide rearwardly over the floor and between the side members.

Figure 8:
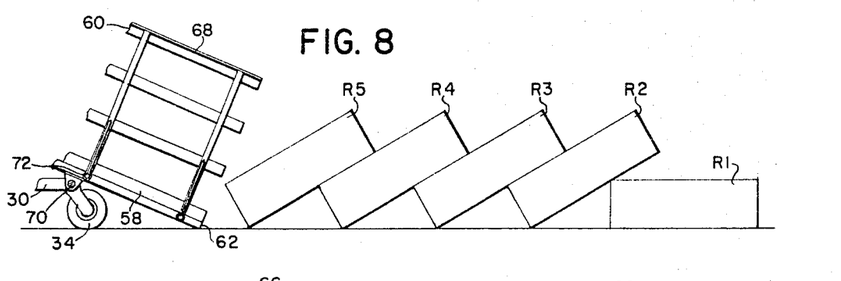
FIG. 8 is a fragmentary view, largely schematic and drawn to the scale of FIG. 2, illustrating the discharge of the bales and the formation of the shingled effect thereof.

The caster wheels 32 and 34 are suitably mounted for individual vertical swinging about upright axes respectively at opposite ends of a transverse tubular support 70, to which the underside of the floor 58 of the trailer body 60 is pivotally connected by bearing brackets 72 (FIG. 8) so that the body 60 is carried by the frame on a transverse pivot axis for tilting between a receiving position and a dumping position, shown in full lines and broken lines respectively in FIG. 2. The dumping position is also shown in FIG. 8. The weight and balance characteristics of the body are such that when it is empty it returns to and remains in its receiving position, in which the floor 58 is generally at the level of the platform extension 48 and thus in bale-transfer relationship thereto. Consequently, the floor is adapted to accumulate the group of bales, here four by five, until fully loaded, which is the condition indicated by the dotted lines representing the twenty bales in FIG. 1. When this occurs, the weight of the bales is such as to cause the body to overbalance to the rear, whereby it moves to its dumping position. Simultaneously, as will be brought out below, the pressure on the side walls 66 and 68 on the bales is relaxed and consequently the entire group of bales is allowed to slide rearwardly off the rear end 62 of the floor. The net result is that shown in FIG. 8, wherein R1 represents the first or rearwardmost transverse row to be discharged. The bales in this row lie flat on the ground, with their lengths in the direction of travel. As the baler and trailer continue to advance, succeeding rows of transversely alined bales, as at R2, R3, R4 and R5 drop to the ground in shingle fashion, the bales in row R2 lying in upwardly and rearwardly sloping fashion on the respective bales in row R1, each bale in row R2 being supported at its forward portion on the ground and at its rearward portion on the forward portion of bales in row R1. Bales in row R3 lie shingle fashion on bales in row R2 and so on. The sloping surfaces of the bales in rows R2 through R5 are capable of shedding water and the spaces between the under portions of the bales and ground enable circulation of air so as to prevent spoilage of the bales in the event that they are left in the field for any length of time in wet weather.

Once the group of bales is discharged to assume the position of FIG. 8, the body 60, as already expressed, returns to its receiving position, and another group of bales is formed in the sequence already noted.

Figure 6:
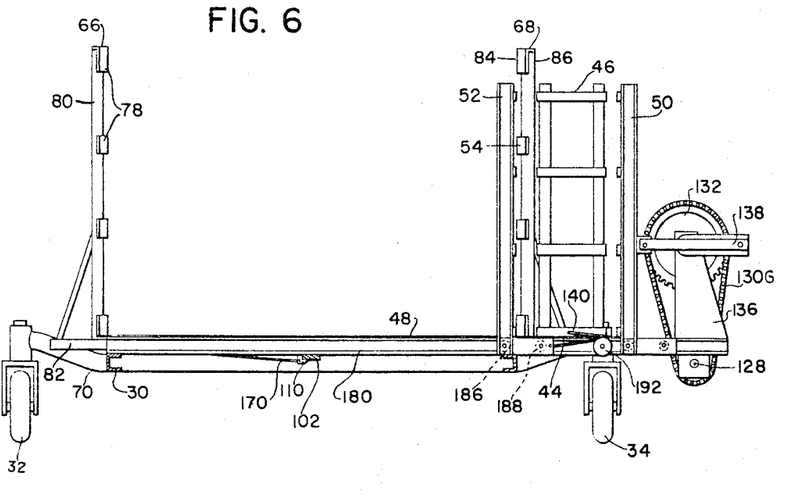
FIG. 6 is a front sectional view, on an enlarged scale, as seen along the line 6—6 of FIG. 1.
Figure 13:
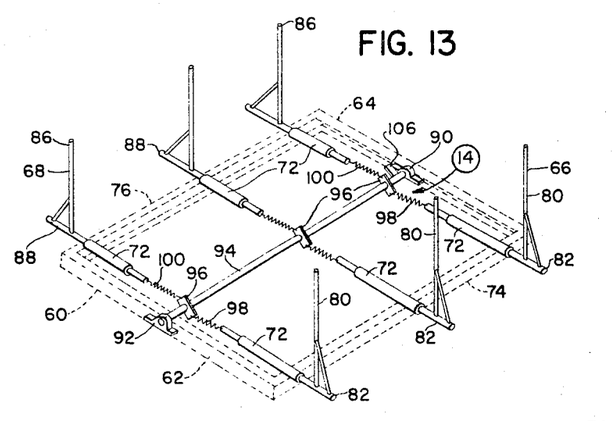
FIG. 13 is a perspective view, with portions shown in dotted lines, of the body and frame and illustrating the means for biasing the side members of the body to apply squeezing pressure to the group of bales.
Figure 14:
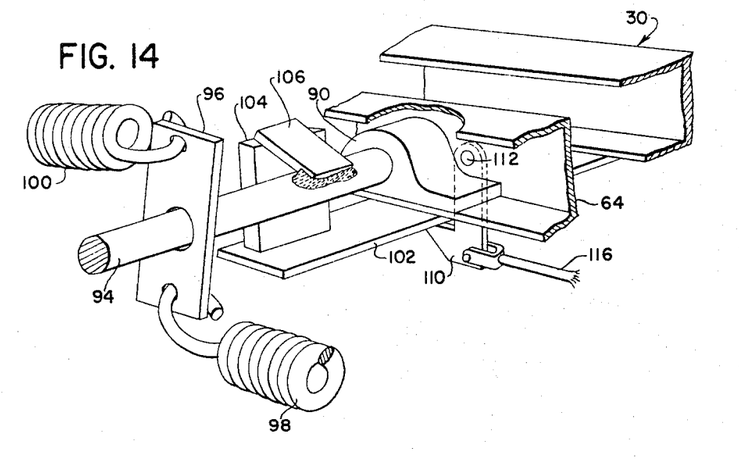
FIG. 14 is an enlarged fragmentary perspective, with portions omitted and other portions shown in section, illustrating that portion of FIG. 13 indicated by the arrow bearing the encircled numeral 14.

The immediately following description will pertain to the manner in which the side walls 66 and 68 are biased to apply and relax a squeezing pressure to and from the bales on the floor 58, in which regard FIGS. 6, 13 and 14 are most significant.

As shown in FIG. 13, the floor 58 is supported in the first instance on a framework, shown here in dotted lines, which carries, at each side, a plurality of lateral tubular supports or guides 72. These may be attached to the frame of the body in any suitable manner. The opposite sides of the floor-supporting frame are designated respectively by the numerals 74 and 76, and the front and rear ends are designated respectively by the numerals 64 and 62, previously employed. The side wall 66 is made up of a plurality of horizontal slats 78 secured to a plurality of fore-and-aft spaced posts or equivalent uprights 80, the lower ends of which are rigidly connected and braced to laterally extending bars 82 slidable respectively in the associated tubular supports 72. Thus, the side wall 66 is movable inwardly and outwardly as a unit because of the mounting of the bars 82 in the associated supports 72.

The other side wall 68 is symmetrically constructed, having horizontal slats 84, posts 86 and laterally extending bars 88, the latter being slidably carried respectively by the associated supports 72.

The front and rear ends of the floor-supporting frame carry bearing brackets 90 and 92, respectively, which provide a fore-and-aft pivot axis for the mounting of a rocking member 94, which is provided intermediate its ends with a plurality of cross members 96 rigid thereon. Opposite ends of each cross member are connected by springs 98 and 100, respectively, to the slide bars 82 and 88 for the respective side walls. As will be seen, when the rocking member 94 is turned in a clockwise direction, as seen in FIGS. 13 and 14, the springs 98 and 100 will be tightened or loaded and therefore will exert greater tensional forces tending to draw the side walls 66 and 68 toward each other, which apply the squeezing pressure to the bales moving rearwardly over the floor 58. Conversely, when the member 94 is rocked in a counterclockwise direction the load on the springs will be relaxed, which of course relaxes the squeezing pressure on the bales. It is a feature of the invention that the member 94 is selectively rocked according to the position of the body, as respects its receiving and dumping phases. For this purpose, there is rigidly secured, as by welding, to a cross member of the frame 30 a rearwardly extending support 102 to which is rigidly secured an upstanding block 104 which, when the body is in its receiving position, engages an arm 106, rigid on the member 94, and capable of imparting to the member 94 a clockwise turning moment. When the floor-supporting frame, together with the body 60, swings upwardly and rearwardly to its dumping position, the free end of the arm 106 of course leaves the block 104 and the springs tend to rock the member 94 in a counterclockwise direction. As they do this they of course relax squeezing pressure from the side walls on the bales. When the body returns to its receiving position, the free end of the arm 106 strikes the top of the block 104, thereby imparting a clockwise turning moment to the shaft or rocking member 94 and re-loading the springs 98 and 100.

In order that premature tipping of the body may be prevented, releasable means is provided for securing the receiving position of the body. This is best illustrated in FIG. 14 as comprising a latch 110 pivoted at 112 to the front end 64 of the floor and engaging beneath the rearwardly extending support 102 on the frame 30. This latch is made releasable in response to attainment by the transverse row R1 of bales of its rearwardmost position, at which stage the rearwardmost right-hand bale B1 engages a trip member 114 at an inner portion of the right-hand side wall 66. This arm is connected by a cable 116 to the latch 110 in such manner that when the arm 114 is forced outwardly by the bale the cable is tensioned to draw the latch outwardly from beneath the support portion 102. The latch means is biased, in any suitable manner, for return to latching position as the body returns to its receiving position. Thus, both relaxation of pressure from the side walls of the body and release of the body for tilting to its dump position occur incident to completion of the formation of the four by five group of bales on the floor 58.

Figure 7:
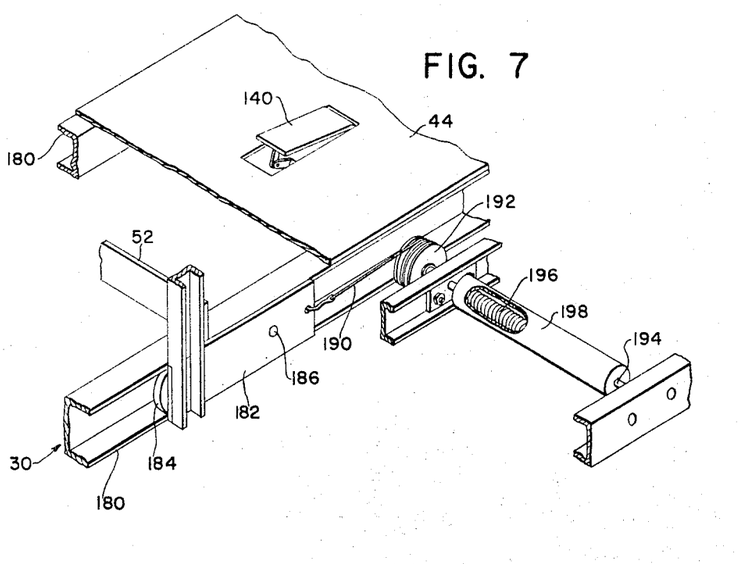
FIG. 7 is a fragmentary perspective illustrating the area of the machine, on an enlarged scale, as seen in the direction of the arrow bearing the encircled numeral 7 in FIG. 1.

That portion of the main frame 30 ahead of the bale-receiving extension 48 is provided with a power source and drive for the pushers 50 and 56. The source of power may be in the form of an internal combustion engine, shown here at 118, from which drive is taken by chain and sprocket means 120 to a cross shaft 122 and thence by an angled shaft 124 to a gear box 126 at the extreme left-hand end of the framework that supports the platform 44. A rearwardly extending shaft 128 is connected by chain and sprocket means 130 to a one-revolution clutch 132, the intermittently rotating part of which is connected to a fore-and-aft shaft 134. Such clutches are well known to those versed in the art and accordingly the clutch here is referred to in appropriate terms. The shaft 134 is appropriately carried in framework or supporting structure 136 and has cranked outer ends connected to a pair of pitmans 138. Each pitman is connected to one side of the pusher 50. The starting position of the shaft 134, when the clutch 132 is disengaged, is that shown in FIG. 1. When the clutch is engaged, the shaft 134 is driven through one revolution, causing the pusher 50 to move one bale width to the right and return, whereupon the clutch is automatically disengaged. The mechanism for accomplishing this is best shown in FIGS. 5 and 7, as well as FIG. 1, wherein it will be seen that on the floor of the platform is a trip member or treadle 140. The one-revolution clutch 132 is typically held in disengaged position by the projection therefrom of a trip arm 142 engaged by one end of a lever 144 that is pivoted on the frame 30 in any suitable manner. This lever is connected by a link 146 to a rockshaft-mounted lever 148 that is in turn connected to the treadle 140. When a bale drops from the rear end 42 of the bale chute 40 onto the platform 44 it of course depresses the treadle and causes the arm 144 to swing out of the path of the pawl 142 of the clutch 132. Thereupon, the clutch becomes engaged, driving its shaft 134 and transferring motion through the pitmans 138 to the pusher 50. As the bale pushed by the pusher clears the platform and is transferred to the left-hand end of the extension 48 it moves off of the treadle and the treadle, being biased for return to its starting position, returns the lever 144 into the path of the pawl 142 of the one-revolution clutch. This pawl of course rotates with the clutch and when it returns to its starting position engages the lever 144 and thereupon disengages the clutch, at which time the pusher 50 is in its retracted position. Hence, actuation of the pusher depends in the first instance upon receipt of a bale by the platform so that the treadle can be depressed. It follows that each time a bale is moved off the platform onto the extension 48 the control mechanism for the clutch is conditioned to disengage the clutch after one revolution.

The pusher 56 is also driven by a one-revolution clutch 150 (FIG. 3). The constantly rotating part of this clutch is chain driven at 152 from the cross shaft 122. The intermittently rotating part of the clutch comprises a shaft 154 to the right-hand end of which is affixed a crank 156 which in turn is connected by a pitman 158 to the right-hand side of the pusher 50. The shaft 154 is cranked at its other end and is connected by a second pitman 160 to the left-hand portion of the pusher. Engagement and disengagement of the clutch 150 is effected by a clutch-carried pawl 162 which, when the clutch is disengaged, is prevented from rotating by the interposition in its path of an arm 164 carried on a vertical rockshaft 166, opposite ends of which are suitably journaled in the frame 30, as at 168. Turning of the rockshaft 166, biased to its position of FIGS. 1 and 3, is effected by a link 170 which is connected to a trip arm 172 pivoted to the frame and projecting at the right-hand end of the extension 48. When the extension contains fewer than a full row of bales, the arm 172 is in an inactive position and the clutch 150 is disengaged, since the arm 164 on the rockshaft 166 holds the clutch pawl 162 against rotation. However, when a full transverse row of bales is accumulated on the extension, the first bale B1, being now at the right-hand end of the extension, engages the trip 172. This, acting through the link 170, turns the rockshaft 166 so that the arm 164 is moved out from below the pawl 162, whereupon the clutch becomes engaged to turn its shaft 154 and thereby, through the pitmans 156 and 160, to push the pusher 56 one stroke to the rear. As the row of bales R1 is transferred from the extension 48 to the forward portion of the floor 58, the trip arm 172 returns to its FIG. 1 position, restoring the control arm 164 as an impediment in the path of the clutch pawl 162. Thus, as the clutch completes one revolution, the pawl 162 engages the arm 164 and returns to its disengaged position, at which time the pusher 56 will be retracted to its position of FIG. 1.

As will be seen, the pusher 56 has no opportunity to move rearwardly while the retainer 52, which is actually the element that trips the arm 172, is short of the extreme right-hand end of the extension. It will also be seen that as the last bale, for example bale B4, moves onto the extension, the treadle 140 is returned to its starting position so that the one-revolution clutch 132 for the pusher 50 becomes disengaged at about the time that the pusher 56 is moving its row R1 of bales rearwardly from the extension 48 to the floor 58. At about the time the pusher 56 returns to its retracted position, another bale will be deposited on the platform 44 and the cycles will be repeated.

The pusher is guided at opposite ends in secondary frame structure 174, as by a pair of fore-and-aft guides 176 (FIG. 4) slidable in tubular members 178 secured to the structure 174.

The immediately following description pertains to the mounting and biasing of the retainer 52, best shown in FIGS. 6 and 7.

Underlying the platform and extension 44 and 48 is a pair of guides or channels 180 which extend crosswise of the frame 30. The lower portion of the retainer 52 is carried, at each of its front and rear sides, by a rigid plate 182 which carries a pair of rollers, one of which is visible at 184 and the shaft of the other of which is visible at 186. The other roller is shown in dotted lines at 188 in FIG. 6. The provision of the two rollers, spaced longitudinally of the associated channel, assures an upright position of the retainer 52.

The plate 182 at the front part of the lower portion of the retainer 52 is connected by a flexible member or cable 190 to a drum 192 which is fixed to a shaft 194. A torsion spring 196 acts between the shaft 194 and a fixed tube 198 to turn the shaft in a clockwise direction as seen in FIG. 7, whereby to cause the drum to wind the cable 190 thereon and thereby to draw the retainer 52 to the left and against the stop 54. As the retainer is moved to the right it draws the cable 190 and tends to unwind same from the drum 192, resisted by the torsion spring 196. This thereby applies a returning pressure to the retainer 52 which in turn applies this pressure to the bale engaged thereby. If it is the first bale that is confined between the pusher 50 and the retainer 52, then the pressure is applied directly to the first bale. When the second bale is engaged by the pusher, the pressure of the retainer is applied to both bales and so on.

After the retainer 52 reaches its right-handmost position to trip the arm 172 so that the pusher 56 moves to the position of FIG. 12, the guide bar 176 at the right-hand end of the pusher will prevent the retainer from returning to its FIG. 1 position until the pusher clears the retainer by return to its starting position, whereupon the spring will draw the retainer back to its starting position. In this regard, it should be understood that the stop 54 combines sufficient resilience to cushion the shock of the returning retainer.

The detailed operation of the structure has been set forth in connection with its description, and need not be repeated except to point out that fundamentally it involves the grouping of bales by first forming a plurality of rows and then moving these rows into a group until a predetermined number of rows are provided, thereafter tipping the body to dumping position so that the bales are discharged to the ground according to the pattern shown in FIG. 8. The mechanisms for operating the two pushers are relatively simple, as are the controls therefor. The squeezing pressure exerted by the side walls 66 and 68 prevents premature tilting or jostling of the bales, which is also the function served as to bales per row by the cooperation between the retainer 52 and bales confined between it and the pusher 50.

Features and advantages other than those enumerated herein will readily occur to those versed in the art, as will many modifications and alterations in the preferred embodiment disclosed, all of which may be achieved without departure from the spirit and scope of the invention.

What claimed is:

1. A bale-handling machine, comprising: a supporting frame having means for connection to and travel with a pick-up baler having a bale outlet; a body having a floor and front and rear ends; means mounting the body on the frame for tilting about a transverse axis between a receiving position wherein the floor is generally level and in bale-receiving relation to the bale outlet and a dumping position in which the floor inclines downwardly and rearwardly to cause bales to exit at said rear end; means operative to transfer bales successively from the bale outlet to the body in side-by-side on-end positions; means for grouping said bales into at least one fore-and-aft row of on-end bales and with one bale rearwardmost at the rear end of the body and with each succeeding bale abutting the next preceding bale; and means operative incident to the formation of said row to cause tilting of the body to its dumping position to deliver said row of bales to the ground whereby the rearwardmost bale lies flat on the ground and succeeding bales lie in upwardly and rearwardly sloped shingle fashion as the machine continues to advance, each such succeeding bale being supported at its forward portion on the ground and at its rearward portion on the preceding bale.

2. A bale-handling machine, comprising: a supporting frame having means for connection to and travel with a pick-up baler having a bale outlet; platform means on the frame adjacent to and for receiving a bale from the outlet in an on-end position; platform extension means on the frame and extending from the platform means crosswise of the line of advance for a distance several times the width of an on-end bale; a body on the frame rearwardly of and coextensive in width with the crosswise extent of the extension means and offset laterally from the platform means, said body including a floor having a front end adjacent and in bale-receiving relation to the extension means and further having a rear delivery end; first shift means on the frame cyclically operative to shift bales successively from the platform means onto the extension means in increments of one bale width per bale to ultimately form a transverse row of on-end bales on and coextensive with said extension means; second shift means on the frame and cyclically operative on successive rows of bales to shift such rows one-bale width rearwardly onto the floor to accumulate on said floor a plurality of transverse rows of on-end bales in fore-and-aft abutting relationship; and means operative incident to a predetermined accumulation of rows for discharging said rows from the floor at the rear end of said body.

3. The invention defined in claim 2, including: retaining means movable with the first shift means for engaging bales received on the platform means and platform extension means for retaining such bales against tipping laterally.

4. The invention defined in claim 2, in which: the means for discharging the rows of bales includes a pivotal mounting of the body on the frame on a crosswise axis for tilting relative to the extension means between a receiving position wherein the floor is generally level and in bale-receiving relation to the extension means and a dumping position in which the floor inclines downwardly and rearwardly to cause bales to exit at said rear end; and means operative upon attainment of said accumulation to cause tilting of the body to its delivery position to deliver said accumulation of bales downwardly and rearwardly at said rear end.

5. A bale-handling machine, comprising: a supporting frame having means for connection to and travel with a pick-up baler having a bale outlet; a body having a floor and front and rear ends; means mounting the body on the frame for tilting about a transverse axis between a receiving position wherein the floor is generally level and in bale-receiving relation to the bale outlet and a dumping position in which the floor inclines downwardly and rearwardly to cause bales to exit at said rear end; means operative to transfer bales successively from the bale outlet to the body in side-by-side on-end positions; means for grouping said bales into at least one fore-and-aft row of on-end bales with one bale rearwardmost at the rear end of the body and with each succeeding bale abutting the next preceding bale; means operative incident to the formation of said row to cause tilting of the body to its dumping position to deliver said row of bales to the ground whereby the rearwardmost bale lies flat on the ground and succeeding bales lie in upwardly and rearwardly sloped shingle fashion as the machine continues to advance, each such succeeding bale being supported at its forward portion on the ground and at its rearward portion on the preceding bale; and means operative to confine the row of bales against premature rearward delivery until the body tilts to its said dumping position, said means including relatively laterally movable members respectively at opposite sides of the body, pressure means for moving said members relatively inwardly to apply a squeezing force to said row of bales; and means operative on said pressure means incident to completion of said row for releasing said squeezing force to enable rearward delivery of said row.

6. A bale-handling machine, comprising: a supporting frame having means for connection to and travel with a pick-up baler having a bale outlet; a body having a floor and front and rear ends; means mounting the body on the frame for tilting about a transverse axis between a receiving position wherein the floor is generally level and in bale-receiving relation to the bale outlet and a dumping position in which the floor inclines downwardly and rearwardly to cause bales to exit at said rear end; means operative to transfer bales successively from the bale outlet to the body in side-by-side on-end positions; means for grouping said bales into at least one fore-and-aft row of on-end bales with one bale rearwardmost at the rear end of the body and with each succeeding bale abutting the next preceding bale; means operative incident to the formation of said row to cause tilting of the body to its dumping position to deliver said row of bales to the ground whereby the rearwardmost bale lies flat on the ground and succeeding bales lie in upwardly and rearwardly sloped shingle fashion as the machine continues to advance, each such succeeding bale being supported at its forward portion on the ground and at its rearward portion on the preceding bale; and means operative to apply a lateral squeezing force to the bales to confine the bales to their on-end positions until the body tilts to its said dumping position.

7. A bale-handling machine, comprising: a supporting frame having means for connection to and travel with a pick-up baler having a bale outlet; platform means on the frame adjacent to and for receiving a bale from the outlet in an on-end position; platform extension means on the frame and extending from the platform means crosswise of the line of advance for a distance several times the width of an on-end bale; a body on the frame rearwardly of and coextensive in width with the crosswise extent of the extension means and including a floor having a front end adjacent and in bale-receiving relation to the extension means and further having a rear delivery end; first shift means on the frame cyclically operative to shift bales successively from the platform means onto the extension means in increments of one bale width per bale to ultimately form a transverse row of on-end bales on and coextensive with said extension means; second shift means on the frame and cyclically operative on successive rows of bales to shift such rows one-bale width rearwardly onto the floor to accumulate on said floor a plurality of transverse rows of on-end bales in fore-and-aft abutting relationship; means operative incident to a predetermined accumulation of rows for discharging said rows from the floor at the rear end of said body; and retaining means movable with the first shift means for engaging bales received on the platform means and platform extension means for retaining such bales against tipping laterally, said retaining means being operative to apply a lateral squeezing pressure to said bales of such value as to retain said bales while enabling movement of the row of bales by the second shift means.

8. A bale-handling machine, comprising: a supporting frame having means for connection to and travel with a pick-up baler having a bale outlet; platform means on the frame adjacent to and for receiving a bale from the outlet in an on-end position; platform extension means on the frame and extending from the platform means crosswise of the line of advance for a distance several times the width of an on-end bale; a body on the frame rearwardly of and coextensive in width with the crosswise extent of the extension means and including a floor having a front end adjacent and in bale-receiving relation to the extension means and further having a rear delivery end; first shift means on the frame cyclically operative to shift bales successively from the platform means onto the extension means in increments of one bale width per bale to ultimately form a transverse row of on-end bales on and coextensive with said extension means; second shift means on the frame and cyclically operative on successive rows of bales to shift such rows one-bale width rearwardly onto the floor to accumulate on said floor a plurality of transverse rows of on-end bales in fore-and-aft abutting relationship; means operative incident to a predetermined accumulation of rows for discharging said rows from the floor at the rear end of said body; and retaining means movable with the first shift means for engaging bales received on the platform means and platform extension means for retaining such bales against tipping.

9. A bale-handling machine, comprising: a supporting frame having means for connection to and travel with a pick-up baler having a bale outlet; platform means on the frame adjacent to and for receiving a bale from the outlet in an on-end position; platform extension means on the frame and extending from the platform means crosswise of the line of advance for a distance several times the width of an on-end bale; a body on the frame rearwardly of and coextensive in width with the crosswise extent of the extension means and including a floor having a front end adjacent and in bale-receiving relation to the extension means and further having a rear delivery end; first shift means on the frame cyclically operative to shift bales successively from the platform means onto the extension means in increments of one bale width per bale to ultimately form a transverse row of on-end bales on and coextensive with said extension means; second shift means on the frame and cyclically operative on successive rows of bales to shift such rows one-bale width rearwardly onto the floor to accumulate on said floor a plurality of transverse rows of on-end bales in fore-and-aft abutting relationship; means operative incident to a predetermined accumulation of rows for discharging said rows from the floor at the rear end of said body; and retaining means operative on the floor-accumulating rows of bales to retain said rows against lateral and fore-and-aft tipping, said retaining means including relatively laterally movable fore-and-aft opposite sides on the body operative to frictionally engage the respective outermost bales in each row.

10. The invention defined in claim 9, including: biasing means acting inwardly on said body sides.

11. The invention defined in claim 10, including: means operative upon accumulation of a predetermined number of rows of bales to relax said biasing means.

12. A bale-handling machine, comprising: a supporting frame having means for connection to and travel with a pick-up baler having a bale outlet; platform means on the frame adjacent to and for receiving a bale from the outlet in an on-end position; platform extension means on the frame and extending from the platform means crosswise on the line of advance for a distance several times the width of an on-end bale; a body on the frame rearwardly of and coextensive in width with the crosswise extent of the extension means and offset laterally from the platform means, said body including a floor having a front end adjacent and in bale-receiving relation to the extension means and further having a rear delivery end; first shift means on the frame cyclically operative to shift bales successively from the platform means onto the extension means in increments of one bale width per bale to ultimately form a transverse row of on-end bales on and coextensive with said extension means; second shift means on the frame and cylically operative on successive rows of bales to shift such rows one-bale width rearwardly onto the floor to accumulate on said floor a plurality of transverse rows of on-end bales in fore-and-aft abutting relationship; means operative incident to a predetermined accumulation of rows for discharging said rows from the floor at the rear end of said body; and retaining means operative on the floor-accumulating rows of bales to retain said rows against lateral and fore-and-aft tipping.

13. A bale-handling machine, comprising: a supporting frame having means for connection to and travel with a pick-up baler having a bale outlet; platform means on the frame adjacent to and for receiving a bale from the outlet in an on-end position; platform extension means on the frame and extending from the platform means crosswise of the line of advance for a distance several times the width of an on-end bale; a body on the frame rearwardly of and coextensive in width with the cross-wise extent of the extension means and including a floor having a front end adjacent and in bale-receiving relation to the extension means and further having a rear delivery end; first shift means on the frame cyclically operative to shift bales successively from the platform means onto the extension means in increments of one bale width per bale to ultimately form a transverse row of on-end bales on and coextensive with said extension means; second shift means on the frame and cyclically operative on successive rows of bales to shift such rows one-bale width rearwardly onto the floor to accumulate on said floor a plurality of transverse rows of on-end bales in fore-and-aft abutting relationship; and means operative incident to a predetermined accumulation of rows for discharging said rows from the floor at the rear end of said body, said first shift means including a bale pusher engageable with one side of a platform-means-received bale and movable one bale width toward the extension means and return, a bale retainer having a starting position spaced toward the extension means one bale width from the returned pusher for engaging the opposite side of the first bale received on the platform means, means biasing the retainer toward the pusher, and one-way stop means on the frame initially engageable with the retainer from the pusher side thereof and subsequently engageable with the pusher sides of succeeding bales for preventing biased return of the retainer to its starting position until a crosswise row of bales is shifted by the second shift means onto said floor.

14. The invention defined in claim 13, in which: the biasing means includes a flexible tension member connected at one end to the retainer, rotatable means on which the other end of said member is unwound and wound as the retainer moves away from and back to the stop means, and torsion spring means acting on the rotatable means in a member-winding direction.

15. The invention defined in claim 13, in which: the extension means includes guide means along a lower portion thereof and extending in the aforesaid crosswise direction, and the retainer is an upright element rising from the extension means and having at a lower part thereof follower means running in said guide means.

16. A bale-handling machine, comprising: a supporting frame having means for connection to and travel with a pick-up baler having a bale outlet; a body having a floor and front and rear ends; means mounting the body on the frame for tilting about a transverse axis between a receiving position wherein the floor is generally level and in bale-receiving relation to the bale outlet and a dumping position in which the floor inclines downwardly and rearwardly to cause bales to exit at said rear end; means operative to transfer bales successively from the bale outlet to the body in side-by-side on-end positions; means for grouping said bales into at least one fore-and-aft row of on-end bales with one bale rearwardmost at the rear end of the body and with each succeeding bale abutting the next preceding bale; means operative incident to the formation of said row to cause tilting of the body to its dumping position to deliver said row of bales to the ground whereby the rearwardmost bale lies flat on the ground and succeeding bales lie in upwardly and rearwardly sloped shingle fashion as the machine continues to advance, each such succeeding bale being supported at its forward portion on the ground and at its rearward portion on the preceding bale; and means for laterally confining the row of bales comprising side members respectively along opposite sides of the body, transverse supports connected respectively to the side members and laterally movably carried by the body to mount said side members for relative inward and outward movement, a rocking element carried by the body, biasing means connected between said elements and said supports, and means for rocking said element selectively in opposite directions to load and unload the biasing means and thereby to cause the side members to respectively apply and relax a squeezing force on the bales.

17. The invention defined in claim 16 in which: the rocking element is automatically rocked in its biasing-means-loading direction when the body is in its receiving position and is rocked in the opposite direction incident to movement of the body to its dumping position.

18. The invention defined in claim 16, in which: said supports, rocking element and biasing means are located beneath said floor.

19. A bale-handling machine, comprising: a supporting frame having means for connection to and travel with a pick-up baler including a bale outlet; a body on the frame including a generally rectangular floor means having one of its forward corner portions offset laterally and rearwardly of the bale outlet, said body having means at said corner portion providing a bale inlet; platform means carried on the frame externally of the body and in lateral alinement with the inlet and in rearward alinement with the bale outlet; means operative on successive bales discharged by the outlet to deliver such bales one by one to the platform means in on-end positions; first shift means on the frame and cyclically operative to move successive bales from the platform means to the floor means via said inlet to form said bales into a transverse row across the front edge of the floor means and laterally clear of the platform means; second shift means cyclically operative to shift successive transverse rows rearwardly over the floor means to form a group of bales of several transverse rows; and means for discharging said rows from the floor means.

20. A bale-handling machine, comprising: a supporting frame having means for connection to and travel with a pick-up baler including a bale outlet; a body on the frame including a generally rectangular floor means having one of its forward corner portions offset laterally and rearwardly of the bale outlet, said body having means at said corner portion providing a bale inlet; platform means carried on the frame externally of the body and in lateral alinement with the inlet and in rearward alinement with the bale outlet; means operative on successive bales discharged by the outlet to deliver such bales one by one to the platform means in on-end positions; first shift means on the frame and cyclically operative to move successive bales from the platform means to the floor means via said inlet to form said bales into a transverse row across the front edge of the floor means and laterally clear of the platform means; second shift means cyclically operative to shift successive transverse rows rearwardly over the floor means to form a group of bales of several transverse rows; and means mounting the floor means on the frame for tilting relative to the frame and platform means for discharging said rows from the floor means.

21. A bale-handling machine, comprising: a supporting frame having means for connection to and travel with a pick-up baler including a bale outlet; a body on the frame including a generally rectangular floor means having one of its corner portions offset laterally of the bale outlet, said body having means at said corner portion providing a bale inlet; platform means carried on the frame externally of the body and in lateral alinement with the inlet and in rearward alinement with the bale outlet; means operative on successive bales discharged by the outlet to deliver such bales one by one to the platform means in on-end positions; first shift means on the frame and cyclically operative to move successive bales from the platform means to the floor means via said inlet to form said bales into a row along one edge of the floor means and clear of the platform means; second shift means cyclically operative to shift successive rows transversely to their length and over the floor means to form a group of bales of several rows; and means for discharging said rows from the floor means.

22. A bale-handling machine, comprising: a supporting frame having means for connection to and travel with a pick-up baler having a bale outlet; a body having a floor and front and rear ends; means mounting the body on the frame for tilting about a transverse axis between a receiving position wherein the floor is generally level and in bale-receiving relation to the bale outlet and a dumping position in which the floor inclines downwardly and rearwardly to cause bales to exit at said rear end; means operative to transfer bales successively from the bale outlet to the body in side-by-side on-end positions; means for grouping said bales into at least one fore-and-aft row of on-end bales and with one bale rearwardmost at the rear end of the body and with each succeeding bale abutting the next preceding bale; means operative incident to the formation of said row to cause tilting of the body to its dumping position to deliver said row of bales to the ground whereby the rearwardmost bale lies flat on the ground and succeeding bales lie in upwardly and rearwardly sloped shingle fashion as the machine continues to advance, each such succeeding bale being supported at its forward portion on the ground and at its rearward portion on the preceding bale; means on the frame for receiving a further bale from the bale outlet while the body is in its dumping position; and means for moving said further bale onto the body floor when the body returns to its receiving position.

References Cited by the Examiner

UNITED STATES PATENTS 3,010,593 11/1961 Adams et al. ________ 214—519
3,092,272 6/1963 Weigel ____________ 214—501

GERALD M. FORLENZA, *Primary Examiner.*

A. J. MAKAY, *Assistant Examiner.*